United States Patent Office 3,461,097
Patented Aug. 12, 1969

3,461,097
POLYCARBONATES OF THE BISPHENOL OF DICYCLOPENTADIENE
Robert J. Cotter, Bernardsville, Francis N. Apel, Nutley, and Louis B. Conte, Jr., Newark, N.J., assignors to Union Carbide Corporation, a corporation of New York
No Drawing. Original application Feb. 24, 1964, Ser. No. 347,335, now Patent No. 3,419,624, dated Dec. 31, 1968. Divided and this application Feb. 16, 1967, Ser. No. 633,314
Int. Cl. C08g *17/13;* C07c *39/14*
U.S. Cl. 260—47
5 Claims

ABSTRACT OF THE DISCLOSURE

Polycarbonates of the bisphenol of dicyclopentadiene, having useful physical properties, can be prepared by the interfacial polymerization of the corresponding dichloroformate in aqueous sodium hydroxide-methylene chloride mixture.

---

This application is a divisional application of application Ser. No. 347,335, filed Feb. 24, 1964, now U.S. Patent No. 3,419,624, issued Dec. 31, 1968.

This invention relates to novel bisphenols and condensation polymers prepared from them.

Heretofore it has been known to condense phenols with aldehydes and ketones to produce bisphenols. The bisphenols thus produced have their phenolic portions on a single carbon atom. The close proximity of the phenolic portions has limited the control which can be exercised over the properties of these known bisphenols and condensation polymers containing these bisphenol moieties. Methods have been proposed to put the phenolic portions on different carbon atoms as by a double Fries rearrangement of the phenolic esters of dibasic acids, but such processes have not been practically useful.

It is an object, therefore, of the present invention to provide bisphenols wherein the phenolic portions are attached to different carbon atoms.

It is another object to provide condensation polymers containing bisphenol moieties whose phenolic portions are attached to different carbon atoms.

It is another object to provide bisphenol condensation polymers having high glass transition temperatures and inherent toughness.

It is another object to provide a practical method for producing bisphenols whose phenolic portions are on different carbon atoms.

It is another object to provide novel bisphenols.

It has now been discovered that bisphenols having phenolic portions on different carbon atoms are prepared by contacting together dicyclopentadiene and at least a stoichiometric amount of a phenol with an acidic cation exchanging resin as a catalyst.

The reaction shown for phenol and dicyclopentadiene proceeds, in general, as follows:

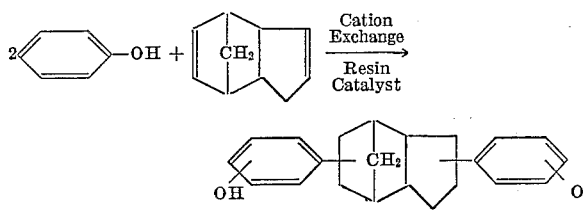

This compound is a bisphenol of dicyclopentadiene, and is a new compound.

A substantial molar excess of phenol over dicyclopentadiene is desirable. Thus molar ratios of from 3 to 20 and more moles of the phenol per mole of dicyclopentadiene are completely suitable. Molar ratios of from 6 to 12 moles of phenol per mole of dicyclopentadiene provide good reaction rates and are easily handled, and hence, are preferred. Molar ratios of about 10 to 1 of phenol per mole of dicyclopentadiene provide optimum rates with the catalyst of this invention and, hence, are particularly preferred.

The reaction can be carried out at atmospheric, subatmospheric or superatmospheric pressure and at temperatures ranging from about 30° C. to about 150° C. Reaction temperatures above about 50° C. insure good viscosity in the reaction mixture and temperatures below about 125° C. permit reaction without use of elaborate pressure equipment and thus are preferred. Particularly preferred is reaction under atmospheric pressure at temperatures from 70° C. to 100° C.

Dicyclopentadiene, which results from the dimerization of cyclopentadiene exists in two stereoisomeric forms, viz., endo and exo, either or both of which can be used in the invention. The endo form is produced when cyclopentadiene dimerizes at about 100° C. It has a melting point of 32.5° C. and a boiling point of 170° C. The exo form is obtained when the dimerization occurs at temperatures above 150° C. It has a melting point of 19.5° C. and a boiling point of 172° C. Commercially available dicyclopentadiene is predominantly the endo form.

Phenols which can be reacted with dicyclopentadiene to form the bisphenols of this invention are hydroxy substituted aryl compounds having a replaceable hydrogen attached to a ring carbon atom in a position other than meta, i.e. either ortho or para to a phenolic hydroxyl. Thus the term "phenol" includes mono-nuclear, substituted and unsubstituted hydroxyaryl compounds. A "replaceable hydrogen" as the term is used in the present specification and claims is (1) a hydrogen which is attached to a carbon atom which is not impeded from reacting with dicyclopentadiene by the spatial arrangement of nearby atoms forming a part of the same molecular, i.e., is sterically unhindered and (2) is electronically unhindered, i.e., is not limited in activity by the presence, in other positions on the phenolic ring of substituents tending to attract the ortho and para hydrogen more strongly to the phenolic ring, e.g., nitro groups. Among the phenols having replaceable hydrogens in the positions ortho and para to a phenolic hydroxyl, some of those deserving of special mention are: hydroxy substituted benzenes, e.g., phenol, catechol, pyrrogallol, resorcinol, phloroglucinol, and unsymmetrical trihydroxy substituted benzenes; substituted phenols having in the meta positions, ortho positions or para position, providing at least one of the ortho position or the para position is unsubstituted, one or more ortho or para directing substituents such as alkyl groups, aryl groups, alkaryl groups, aralkyl groups, halogen groups, i.e., fluorine, chlorine, bromine and iodine, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guiacol, 4-ethylresorcinol, 5-methylresorcinol, 4-propylresorcinol, carvacrol, methylphenol, ethylphenol, butylphenol, octylphenol, dodecylphenol, eicosylphenol, tricontylphenol, and

| | |
|---|---|
| tetracontylphenol | 3,4-dimethylphenol, |
| 2,3-dimethylphenol, | 3-methyl-4-ethylphenol, |
| 2-ethyl-4-methylphenol, | 3,5-dimethylphenol, |
| 2,4-diethylphenol, | 3,5-diethylphenol, |
| 2-methyl-4-butylphenol, | 2-chloro-4-methylphenol, |
| 2-ethyl-5-methylphenol, | 2-ethyl-4-chlorophenol, |
| 2-methyl-5-isopropylphenol, | 3-chloro-4-methylphenol, |
| 2-propyl-5-methylphenol, | 2,3,4-trimethylphenol, |
| 2-isopropyl-5-methylphenol, | 2,3,5-trimethylphenol, |
| 2,6-dimethylphenol, | 2,4-dimethyl-5-ethylphenol, |
| 2-methyl-6-ethylphenol, | 2-ethyl-4,5-dimethylphenol, |
| 2,6-diethylphenol, | 2,4-diethyl-5-methylphenol, |
| 2-methyl-6-propylphenol, | 3,4,5-trimethylphenol | and higher alkyl phenols.

Thus the term "bisphenol of dicyclopentadiene" as used herein includes compounds having the formula

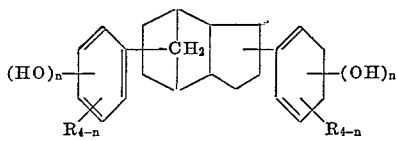

wherein R is a hydrogen, a halogen, a hydrocarbon substituent free of aliphatic unsaturation, or a saturated oxyhydrocarbon substituent on a phenolic ring carbon atom, selected for example, from alkyl, aryl, alkaryl, aralkyl, alkoxy, or fluorine, chlorine, bromine or iodine groups, and $n$ is an integer from 1 to 3. Hence, the term "phenyl" herein includes substituted phenyl radicals. The point of attachment of the above phenolic portions can be ortho or para to a phenolic hydroxyl.

The catalyst used in the reaction of the above phenols with dicyclopentadiene in the present invention comprises the hydrogen for m(H+) of a cation exchanging resin, i.e., an "acidic" cation exchanging resin. These resins are insoluble in the reaction mixture and hence, there is no problem of catalyst separation from the reaction zone effluent or need of removal of small amounts of impurities in the product. Throughout the reaction and product recovery the catalyst remains in the reaction zone. The service life of the acidic cation exchanging resin in this method is nearly infinite and hence, the resin does not of necessity have to be regenerated, if care is exercised in preventing the introduction of basic metal ions such as sodium, potassium, calcium, etc. or other contaminants which inactivate the cation exchanging groups of the resin. The use of this insoluble catalyst confers the additional advantagese of (1) eliminating the need for acid corrosion resistant equipment which is otherwise essential, and (2) making unnecessary any neutralization steps.

The cation exchanging resins are substantially insoluble polymeric skeletons with strongly acidic cation exchanging groups chemically bound thereto. The exchange potential of the bound acidic groups and the number of them which are available for contact with the phenol and dicyclopentadiene reaction mixture determine the alkylating effectiveness of a particular cation exchanging resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surface or in the interior of the cation exchanging resein; therefore, a form of resin which provides a maximum amount of surface area for contact and diffusion, e.g., porous microspheres or beads, is highly desirable and affords the highest rate of reaction and reaction economy in this process. The particular form of the cation exchanging resin used, however, is not critical.

The cation exchanging resins should be substantially insoluble in the reaction mixture and in any solvent to which the resin may be exposed in service. Resin insolubility is generally attributable to cross-linking within the resin but can be caused by other factors, e.g., high molecular weight or a high degree of crystallinity.

In general, the greater the exchange capacity of a resin, i.e., the greater the number of milliequivalents of acid per gram of dry resin, the more desirable is the resin. Resins having an exchange capacity greater than about two milli-equivalents of acid per gram of dry resin are preferred. Particularly preferred are resins with bound cation exchanging groups of the stronger exchange potential acids. Results obtained with cation exchanging resins having bound sulfonic acid groups have been highly satisfactory. Among the cation exchanging resins which are highly deserving of special mention are: sulfonated styrene-divinylbenzene copolymers, sulfonated crosslinked styrene polymers, phenol formaldehyde sulfonic acid resins, benzene-formaldehyde-sulfonic acid resins, and the like. Most of these resins and many others are available commercially under trade names such as: Amberlite XE-100 (Rhom and Haas Co.); Dowex 50-X-4 (Dow Chemical Co.); Permutit QH (Permutit Co.); and Chempro C-20 (Chemical Process Co.).

Many cation exchanging resins are received from the manufacturer in the form of the sodium or other salt and must be converted to the hydrogen or acid form prior to use in this process. The conversion can be easily accomplished by washing the resin with a solution of a suitable mineral acid, e.g., sulfuric, hydrofluoric or hydrochloric acids. For example, a sulfonated resin can be suitably washed with a sulfuric acid solution. Salts formed during the conversion procedure are conveniently removed by washing the resin with water or solvent for the salt. In this process the wash acid is of no significance as a catalyst but only serves to put the cation exchanging resin in a suitable form.

It frequently happens as a result of either the washing operation outlined above, or the manufacturer's method of shipping, that the resin will contain from 50 percent to 100 percent of its own weight of water. All but about 2% of this water as a maximum is preferably removed prior to use of the cation exchanging resin. Suitable methods for removing the water in the resin include drying the resin under reduced pressure in an oven; soaking the resin in melted anhydrous phenol for a time sufficient to fill the resin interspaces with phenol; and azeotropic distillation of water and phenol in the presence of an excess of phenol.

The resin when once conditioned in this manner to insure anhydrous conditions, i.e. <2% water throughout does not require reconditioning at any time during use. Alternatively, the resin can be conditioned after installation in the process equipment merely by running the reaction mixture through the resin until sufficient water is removed. In this latter procedure dehydration is accomplished by the phenol.

The bisphenols of this invention are readily separable from the resin catalyst by filtration and can be purified by a vacuum stripping operation which removes undesirable impurities.

It has been found that condensation polymers can be synthesized from the bisphenols of this invention which exhibit in addition to other physical properties high glass transition temperatures, tensile strengths and tensile moduli.

For example, polycarbonates of bisphenols of dicyclopentadienes can be readily prepared in interfacial condensation systems. In a preferred synthesis the dichloroformate of the bisphenol of dicyclopentadiene is prepared first with phosgene and dimethylaniline. When polymerized with an aqueous sodium hydroxide-methylene chloride mixture, a polycarbonate is obtained represented by the following structure:

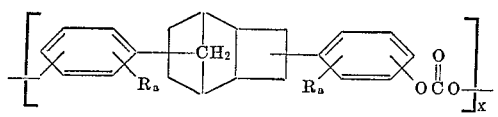

wherein $x$ is an integer denoting the degree of polymerization and has values sufficiently high to afford a normally solid polymer, R is a member selected from the group consisting of hydrogen, halogen, hydrocarbon free of aliphatic unsaturation and saturated oxyhydrocarbon groups, and $a$ is an integer having values of 0 to 4.

The preparation of polycarbonates of bisphenols of dicyclopentadiene is not limited to this method since direct phosgenation or ester interchange utilizing a diaryl carbonate, such as diphenyl carbonate can also be employed.

As a variation bisphenols of dicyclopentadiene can also be polymerized with other bisphenols as for example, bis-phenol-A (2,2-bis(p-hydroxyphenyl)propane) to provide carbonate copolymers.

The structure of these copolymers is represented below:

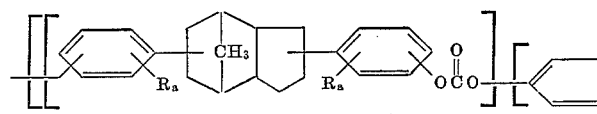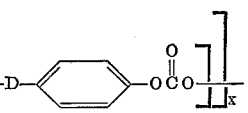

wherein R is a hydrogen, a halogen, a hydrocarbon group free of aliphatic unsaturation, or a saturated oxyhydrocarbon group. $a$ is an integer having values of 0 to 4 and D is a divalent radical such as alkylidene, cycloalkylidene, or arylene radicals, or

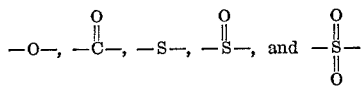

radicals and $x$ is an integer having values sufficiently high to afford normally solid polymers.

Another series of useful condensation polymers available from bisphenols of dicyclopentadiene is the polyurethanes. Thus when the dichloroformate of a bisphenol of dicyclopentadiene is caused to react with piperazine a polyurethane is obtained having the structure:

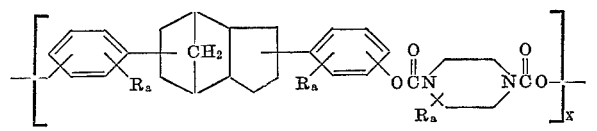

wherein $x$ is an integer having values sufficiently high to afford a normally solid polymer, R is as defined above for the polycarbonates of this invention, and $a$ is an integer having values of 0 to 4.

Other synthetic routes such as direct phosgenation or ester interchange can also be used to prepare these urethanes.

Polyesters of bisphenols of dicyclopentadiene can be synthesized by interacting dicarboxylic acids, esters or acid halides with bisphenol dicyclopentadiene, with or without the use of a solvent.

Poly(hydroxyethers) of bisphenols of dicyclopentadiene can be prepared by the procedure described in French Patent 1,309,491.

Other applications for the bispheonols of dicyclopentadiene include their use as hardeners for epoxy resins, bacteriacides, fungicides, miticides and antioxidants.

The following examples illustrate the practice of the present invention. All parts and percentages are by weight unless otherwise stated.

Example 1.—Preparation of bisphenol of dicyclopentadiene

To a one-liter, three-necked, round-bottom flask equipped with a mechanical stirrer, thermometer, reflux condenser, dropping funnel and heating mantle, was added 940 g. (10 moles) of freshly distilled, molten phenol and 250 g. (about one hydrogen equivalent) of the acid form of Dowex 50 X-4 which has had essentially all of the water displaced by phenol. The resultant slurry was heated to 70–75° C. and heating then discontinued. One mole of dicyclopentadiene (132 g.) was added dropwise while the exotherm was controlled with cooling water to maintain the temperature at 70–75° C. As the exotherm diminished heat was applied. At the end of the 22 hour reaction period, the mixture was filtered and the catalyst washed with 250 ml. of freshly distilled molten phenol. The combined filtrate and washings were distilled to remove the fraction boiling up to 200° C. at 1–5 mm. The yield of crude bisphenol of dicyclopentadiene remaining in the distillation pot as residue was 312 g. or 97.5%. A sample recrystallized from toluene for analysis had a melting point of 198–200° C. and an hydroxyl value of 10.4% (theoretical value=10.6%).

Analysis by means of reversed phase filter paper chromotography in which the sample is carried by an aqueous alkaline solution through paper impregnated with tri cresyl phosphate indicated that the product was essentially bisphenol of dicyclopentadiene. There was a strong single band with a front ratio value ($R_f$) of 0.14 and a very weak band with a value of 0.07.

The dimethyl ether of bisphenol of dicyclopentadiene was prepared as further proof of structure by refluxing a solution of 4.4 g. (0.014 mole) of bisphenol of dicyclopentadiene in 50 ml. of acetone with 1.2 g. (0.03 mole) of sodium hydroxide pellets and 4.0 g. (0.03 mole) of methyl iodide for 3 hours. This mixture was refluxed for 4 more hours with an additional 4.0 g. of methyl iodide. The crystalline product which separated out on cooling in a yield of 90% had a melting point of 87–89° C. after recrystallization from isopropanol. The product was identified further by the infrared absorption spectrum as the dimethyl ether of bisphenol of dicyclopentadiene.

The amount of cation exchanging resin used can be varied over a wide range with commensurate rates of reaction. Concentrations of catalyst ranging from about 0.1 to about 5 acid equivalents per mole of dicyclopentadiene are preferred. Lower concentrations provide less rapid reaction rates. Cation exchanging resin concentrations ranging from about three tenths of an acid equivalent to about four acid equivalents per mole of dicyclopentadiene have given excellent results and are particularly preferred.

A concentration of about one acid equivalent of cation exchangnig resin per mole of dicyclopentadiene provides the optimum combination of reaction rate, yield, and product quality. It is a particularly desirable concentration when operating at temperatures between about 70° and 75° C. with a 10:1 ratio of phenol to dicyclopentadiene.

Example 2.—Preparation of bis o-cresol of dicyclopentadiene

To a round bottom, three-necked flask fitted with stirrer, thermometer, reflux condenser and a dropping funnel is added 1,080 grams (10 moles) of o-cresol and 250 grams (about 1 acid equivalent) of a sulfonated styrene-divinyl benzene copolymer cation exchanging resin prepared as described above by replacing with o-cresol substantially all the water therefrom, i.e., less than 2%.

The catalyst o-cresol mixture is heated to 70–75° C. and 132 grams (1 mole) of dicyclopentadiene is added dropwise over a 30-minute period. Cooling during this period maintains the temperature of the reactants between 70 and 75° C. After the addition and when the exotherm subsides, heat is applied for an additional 5 hours to maintain a temperature between 70 and 75° C.

After this period the warm reaction mixture is filtered and the catalyst washed with 250 grams of molten o-cresol. The combined filtrate and washings are distilled at a reduced pressure to a final residue temperature of 200° C.

at about 1 mm. Hg pressure. The residue comprises the bis o-cresol of dicyclopentadiene.

Example 3.—Preparation of bis o-chlorophenol of dicyclopentadiene

The apparatus and the procedure of Example 2 are used but o-chlorophenol is substituted for the o-cresol. The residue comprises the bis o-chlorophenol of dicyclopentadiene.

Other hydroxyaryl compounds can be reacted with dicyclopentadiene to produce the corresponding bis compounds. For example, polynuclear substituted and unsubstituted hydroxyaryl compounds, e.g., the naphthols especially α- and β-naphthols are readily reacted with dicyclopentadiene using the cation exchanging resin catalysts of the present invention.

The preparation is illustrated by the following example:

Example 4.—Preparation of bisnaphthol of dicyclopentadiene

In a two liter flask equipped with a stirrer, thermometer, dropping funnel and reflux condenser is placed 900 grams of α-naphthol. The temperature is raised to 100° C. and with stirring there is added 200 grams of oven dried (105–110° C.) Dowex 50 X–4 cation exchanging resin in the acid (H+) form.

Stirring is continued and 66 grams of dicyclopentadiene is added dropwise over a 1 hour period at 100–105° C. Heating and stirring are continued for 4 hours after addition is completed.

The reaction mixture is filtered and the cation exchanging resin washed with 200 grams α-naphthol. The filtrate and washings are combined and distilled at less than 0.5 mm. Hg to a final residue temperature of 200° C.

The residue is the bis naphthol of dicyclopentadiene.

Example 5.—Preparation of the dichloroformate of bisphenol of dicyclopentadiene

To a slurry of 25.4 g. (0.0795 mole) of bisphenol dicyclopentadiene and 250 ml. of toluene contained in a 3-neck, round bottom flask equipped with a mechanical stirrer, reflux condenser, thermometer and dropping funnel was added 16.5 g. (0.167 mole) of phosgene. A solution of 19.25 g. (0.195 mole) of dimethylaniline in 20 ml. of toluene was then added dropwise from the dropping funnel. The reaction mixture was stirred at ambient temperatures for about 2 hours. Insoluble dimethylaniline was removed from the reaction product by filtration and the filtrate stripped of solvent in a vacuum distillation. The residue was dissolved in 100 ml. of methylene chloride and the solution passed through a silica gel column (2.9 x 26.2 centimeters). The product was eluted with 250 ml. of methylene chloride and the combined eluants were stripped free of solvent. The residue amounting to 23.03 g. was identified by infrared absorption spectra as the dichloroformate of bisphenol dicyclopentadiene having a typical chloroformate carbonyl absorption band at 5.65 microns. There was no absorption at 3.0 microns, the band for phenolic hydroxyl absorption.

Example 6.—Polymerization of the dichloroformate of bisphenol dicyclopentadiene

A solution of 4.45 g. (0.01 mole) of bisphenol dicyclopentadiene dichloroformate in 50 ml. of methylene chloride wa added to a solution of 0.8 g. of sodium hydroxide in 75 ml. of water contained in a 3-neck, round bottom flask, equipped with a mechanical stirrer, reflux condenser and thermometer. The reaction mixture was stirred for five minutes followed by the addition of 5 drops of triethylamine and continued stirring for 1.5 hours at ambient temperatures. The reaction mixture was then poured slowly into a Waring Blendor containing 300 ml. of isopropanol. The polycarbonate which was thus precipitated was washed in the blendor with three, 250 ml. portions of water. The product after drying in vacuo amounted to 3.3 g. (95% yield) and possessed a reduced viscosity of 0.43 when measured at a concentration of 0.2 g./100 ml. of chloroform at 25° C. This polycarbonate of bisphenol dicyclopentadiene obtained may be represented by the following structure.

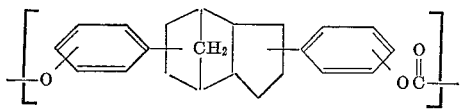

Films of this polycarbonate cast from chloroform were used for Instron analysis which revealed a tensile strength of 5500 p.s.i., tensile modulus of 300,000 p.s.i. and an elongation of 1%. The glass transition temperature (Tg) was 140–150° C.

Example 7.—Copolymerization of bisphenol of dicyclopentadiene with bisphenol-A dichloroformate A mixture of 3.53 g. (0.01 mole) of bisphenol-A dichloroformate in 50 ml. of methylene chloride, 100 ml. of water, 3 drops of triethylamine, 1 g. of sodium hydroxide, 0.1 g. (0.001 mole) of phenol and 3.20 g. (0.01 mole) of bisphenol of dicyclopentadiene was stirred in the apparatus described in Example 6. Stirring was continued for five minutes and then 3 additional drops of triethylamine added. Stirring was continued for 1 hour at ambient temperatures. After precipitation of the copolymer by isopropanol in a Waring Blendor it was washed with three, 350 ml. portions of water. The yield of mixed polycarbonate after drying in vacuo amounted to 5.84 g. (97% yield). This product possessed a reduced viscosity in chloroform at 25° C. of 0.7 (0.2 g. sample in 100 ml. of chloroform). Instron analysis of films of this polycarbonate cast from chloroform showed a tensile strength of 6000 p.s.i., a tensile modulus of 250,000 p.s.i., and an elongation of 5–8%. The Tg was 150° C. and the pendulum impact value was 40 ft. lbs./cu. in. The structure of this polycarbonate is shown below.

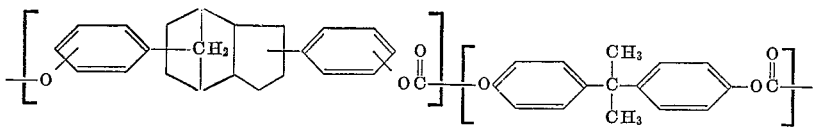

The polycarbonates of this invention can be used for the fabrication of electrical switch components and connectors, instrument cases, lenses, water pump impellers and the like. Extruded film of these polycarbonates can be employed for capacitors and packaging.

Example 8.—Polyurethane of bisphenol of dicyclopentadiene

A solution of 0.86 g. (0.01 mole) of piperazine, 1.0 g. (0.025 mole) of sodium hydroxide, 0.1 ml. of triethylamine in 50 ml. of water was charged to the reaction vessel described in Example 5. A solution of 4.45 g. (0.01 mole) of bisphenol dicyclopentadiene dichloroformate in 50 ml. of methylene chloride was added with stirring. After 5 minutes, 0.15 ml. of triethylamine was added and stirring continued for one hour. The reaction mixture was then poured into a Waring Blendor containing 300 ml. of isopropanol to precipitate the polyurethane of bisphenol dicyclopentadiene which had formed. This polymer was washed three times in the Waring Blendor with 250 ml. portions of water. After drying in vacuo, a yield of 4.22 g. (92% of theory) of this polyurethane was obtained, having a reduced viscosity of 0.45 in chloroform at 25° C. (0.2 g. sample in 100 ml. of chloroform). Films of this polymer cast from chloroform had a tensile strength of 7,000 p.s.i., a tensile modulus of 230,000, an elongation of 10% and a Tg of about 200° C.

The structure of this polyurethane may be represented as shown below:

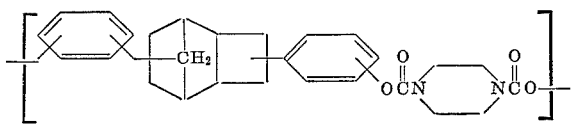

The polyurethanes of this invention can be used to provide tough, abrasion resistant finishes on floors, wire, leather and rubber goods and the like.

Example 9.—Polyurethane of bis o-cresol of dicyclopentadiene

The procedure and apparatus of Example 8 are used with 4.73 g. (0.01 mole) of bis o-cresol of dicyclopentadiene. The polyurethane of bis o-cresol of dicyclopentadiene which forms is similar in physical properties to that derived from the bisphenol of dicyclopentadiene.

Example 10.—Polymerization of the dichloroformate of bis o-chlorophenol of dicyclopentadiene The procedure and apparatus of Example 6 are used with 5.14 g. (0.01 mole) of bis-o-chlorophenol dicyclopentadiene dichloroformate substituted for bisphenol dicyclopentadiene dichloroformate. The polymer which forms is the polycarbonate of bis o-chlorophenol dicyclopentadiene.

Glass transition temperatures (Tg), also referred to as second order phase transition temperatures refer to the inflection temperatures found by plotting the resilience, (recovery from 1 percent elongation) of a film, ranging in thickness from 3–15 mils, against the temperature. A detailed explanation for determining resilience and inflection point is to be found in an article by A. Brown in "Textile Research Journal" volume 25, 1955 at page 891.

The following ASTM procedures were used:
Pendulum impact—ASTM D–256–56.
Tensile strength—ASTM D–882–56T.
Tensile modulus—ASTM D–882–56T.
Elongation to break—ASTM D–882–56T.

Although the invention has been described in its preferred forms, it is understood that the present disclosure has been made only by way of example, and that numerous changes in the details may be resorted to without departing from the spirit and the scope of the invention.

What is claimed is:

1. The bisphenol dicyclopentadiene polycarbonate with a repeating unit having the structure

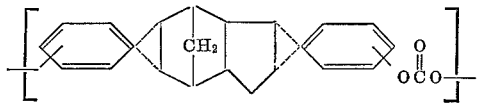

2. The polycarbonate copolymer with a repeating unit having the structure

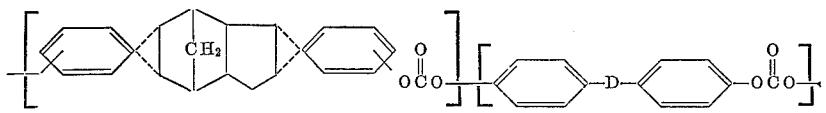

wherein D is a divalent radical selected from the group consisting of alkylidene, cycloalkylidene and arylene radicals,

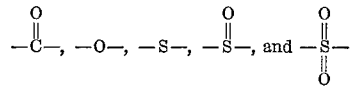

3. The polycarbonate claimed in claim 2 wherein D is a propylidene radical.

4. The polycarbonate claimed in claim 2 wherein D is a cyclohexylidene radical.

5. The polycarbonate claimed in claim 2 wherein D is an —O— radical.

References Cited
UNITED STATES PATENTS 3,317,466  5/1967  Caldwell et al. _____ 260—47
3,347,935  10/1967  Kaupp et al. _____ 260—619

SAMUEL H. BLECH, Primary Examiner

U.S. Cl. X.R.
260—619, 463, 49, 45; 424—346